United States Patent [19]
Supper

[11] 3,943,784
[45] Mar. 16, 1976

[54] MECHANISM FOR THE ACTUATION OF AN ADJUSTING MEMBER

[75] Inventor: Ottmar Supper, Sindelfingen, Germany

[73] Assignee: Daimler-Benz Aktiengesellschaft, Germany

[22] Filed: Mar. 7, 1974

[21] Appl. No.: 449,091

[30] Foreign Application Priority Data
Mar. 8, 1973   Germany............................ 2311410

[52] U.S. Cl..................... 74/110; 98/2.05; 98/41 R
[51] Int. Cl.² ......................................... F16H 21/44
[58] Field of Search .............. 74/110; 415/148, 158; 98/2.05, 2.08, 101, 41 R

[56] References Cited
UNITED STATES PATENTS

| | | | |
|---|---|---|---|
| 1,909,931 | 5/1933 | Dickerson | 98/2.08 |
| 1,966,882 | 7/1934 | Bucklen | 98/2.05 |
| 2,450,113 | 9/1948 | Burchett | 123/97 R |
| 2,970,488 | 2/1961 | Skillings | 74/110 |
| 3,204,885 | 9/1965 | Van Silfhout | 74/110 |
| 3,257,928 | 6/1966 | Toplarski | 98/2.08 |
| 3,308,745 | 3/1967 | Davies | 98/41 R |
| 3,729,271 | 4/1973 | Bonaldi | 415/148 |
| 3,788,207 | 1/1974 | Doherty | 415/158 |

*Primary Examiner*—Benjamin W. Wyche
*Assistant Examiner*—Wesley S. Ratliff, Jr.
*Attorney, Agent, or Firm*—Craig & Antonelli

[57] ABSTRACT

A mechanism for the actuation of an adjusting device such as, for example, a fresh-air flap in a motor vehicle, in which the adjusting member is operatively connected with at least one rotatable lever and the lever cooperates with an actuating member which is displaced along a rectilinear guide path; the actuating member is constructed fork-shaped for the entrainment of the lever and the entrainment takes place by way of a roller, rotatably supported at the lever, which in one end position of the adjusting member is supported with prestress at a prong of the fork-shaped actuating member.

20 Claims, 2 Drawing Figures

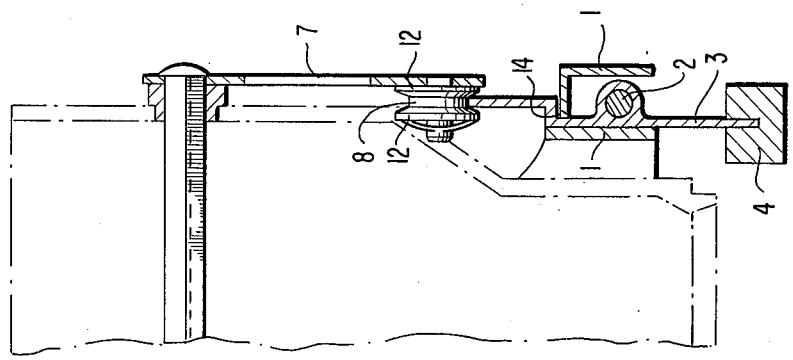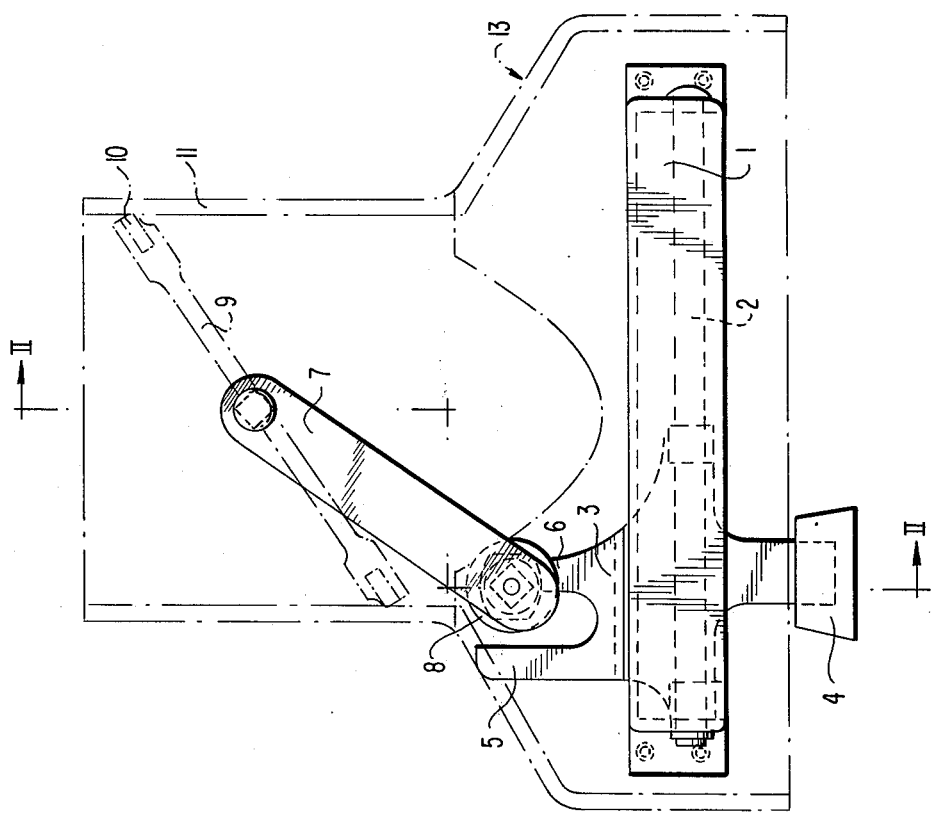

MECHANISM FOR THE ACTUATION OF AN ADJUSTING MEMBER

The present invention relates to a mechanism for the actuation of an adjusting member, such as, for example, a fresh-air valve or flap in a motor vehicle, whereby the adjusting member is operatively connected with at least one rotatably supported lever and the latter cooperates with an actuating member which is displaced along a rectilinear guide path or track.

Such types of adjusting mechanisms are disclosed in the German Offenlegungsschrift No. 1,655,102 and are suited advantageously for the regulation of valves and distributor flaps. Their use for the adjustment of fresh-air valves or flaps, however, is not appropriate because, for example, in the closed position, an automatic opening of the flap or valve may take place by the dynamic pressure acting upon the fresh-air flap whereby in addition to undesired draft appearances, also disturbing wind noises occur.

Though one has already attempted to achieve a fixing of the closed position by the use of an over-dead-center point spring, i.e., by the use of a spring having a toggle action, a large lost motion path had to be accepted in connection therewith up to the point of response of the fresh-air flap.

It is the aim of the present invention to provide an actuating mechanism in which in at least one end position a locking of the adjusting member to be actuated takes place so that an automatic adjustment is impossible. Furthermore, it is to be achieved by the present invention that upon leaving an end position, a response of the adjusting member takes place as immediately as possible.

Consequently, a mechanism for the actuation of an adjusting device, for example, such as a fresh-air flap in a motor vehicle is proposed, whereby the adjusting member is operatively connected with at least one rotatably supported lever and the latter cooperates with an actuating member which is displaced along a rectilinear guide path or track, whereby according to the present invention, the actuating member is constructed fork-shaped for the entrainment of the lever, and whereby the entrainment takes place by way of a roller rotatably supported at the lever, which in one end position of the adjusting device is supported with prestress at a prong or tine of the fork-shaped actuating member.

Though it is already disclosed in the German Offenlegungsschrift No. 2,041,809 to construct fork-shaped the free end of an adjusting lever connected with a flap for the purpose of accommodation of a sliding pin, no support function is ascribed to this fork-shaped end in any end position.

A sliding-off of the actuating member from the roller is prevented if the roller is provided at least with one inclined surface, for example, extending circumferentially at an end face.

A springy support producing a certain prestress of the actuating member in one end position can take place in that the roller is provided with a running or contact surface of an elastic material. However, the roller may also consist in its entirety of an elastic material. Dimensional deviations due to manufacturing reasons can be compensated for in a simple manner by these measures. The same effect is also obtained if the adjusting member is springily or elastically supported in an end position. The roller may also consist of a far-reachingly inelastic material such as, for example, metal.

A wedging or jamming of the fork-shaped actuating member may be avoided if the latter is guided in a manner safe against canting in proximity to its longitudinally displaceable support.

Accordingly, it is an object of the present invention to provide a mechanism for the actuation of an adjusting device which avoids by simple means the aforementioned shortcomings and drawbacks encountered in the prior art.

Another object of the present invention resides in an installation for the actuation of an adjusting device, such as a fresh-air flap, in which an automatic opening of the flap is precluded while at the same time eliminating annoying wind noises and undesired draft appearances.

A further object of the present invention resides in a mechanism for the actuation of an adjusting device in which relatively little lost motion is required before a response takes place out of the closed position.

Still a further object of the present invention resides in a mechanism of the type described above in which a locking of the adjusting member to be actuated takes place in at least one end position so that an automatic adjustment thereof becomes impossible.

A further object of the present invention resides in a mechanism for the actuation of an adjusting device which is simple in construction, relatively inexpensive to manufacture and install and which effectively prevents also any jamming of the mechanism.

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on an adjusting mechanism in accordance with the present invention; and FIG. 2 is a cross-sectional view taken along line II—II of FIG. 1.

Referring now to the drawing wherein like reference numerals are used throughout the two views to designate like parts, reference numeral 1 designates a guide rail adapted to be secured laterally which accommodates a rectilinear guide track 2. A fork-shaped actuating member 3 is longitudinally displaceably arranged along this guide track 2 by means of a handle portion 4. Two prongs 5 and 6 result from the fork-shaped construction of the actuating member 3 which effect an entrainment of a rotatably supported lever 7 by way of a rotatable roller 8 arranged at its free end. The lever 7 is rigidly connected with an adjusting member 9 which in the illustrated embodiment is constructed as throttle valve of a fresh-air supply mechanism illustrated in dash and dot lines. In the closed position of the adjusting member 9, the peripheral seal 10 thereof abuts elastically at the housing wall 11 of the fresh-air supply mechanism, whereby a support with a certain prestress establishes itself between the roller 8 consisting, for example of metal, and the prong 6. It is prevented thereby that the adjusting device 9 is able to open automatically.

The same support effect can also be achieved in that the roller 8 which, for the better guidance of the actuating member 3, includes lateral inclined run-up surfaces 12 (FIG. 2), is made of an elastic material or includes at least a contact or running surface of elastic material.

The guide rail 1 is connected in an advantageous manner (not illustrated in detail) directly with the housing generally designated by reference numeral 13 of the fresh-air supply mechanism and guides the angularly bent actuating member 3 in a slot 14 safely against canting or edging (FIG. 2). If one moves the actuating member 3 out of the illustrated position toward the right, as viewed in FIG. 1, then the supporting effect is lifted, and the roller 8 is taken along by the prong 5 already after a short lost-motion path.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A mechanism for the actuation of an adjusting means in which the adjusting means is operatively connected with at least one rotatably supported lever means and said lever means cooperates with an actuating means which is displaced along a substantially rectilinear guide path, characterized in that the actuating means is constructed fork-shaped for the purpose of taking along the lever means, and in that the entrainment takes place by way of a roller means rotatably supported at the lever means, said roller means being supported in one end position of the adjusting means with prestress at a prong of the fork-shaped actuating means.

2. A mechanism according to claim 1, characterized in that the adjusting means is a fresh-air flap of a motor vehicle.

3. A mechanism according to claim 1, characterized in that the roller means is provided with at least one inclined surface.

4. A mechanism according to claim 1, characterized in that said inclined surface is an inclined surface provided circumferentially at an end face of said roller means.

5. A mechanism according to claim 4, characterized in that the roller means is provided with a contact surface of an elastic material.

6. A mechanism according to claim 4, characterized in that the roller means consists of an elastic material.

7. A mechanism according to claim 4, characterized in that the adjusting means is elastically supported in an end position and that the roller means consists of a far-reaching non-elastic material.

8. A mechanism according to claim 7, characterized in that the roller means consists of metal.

9. A mechanism according to claim 4, characterized in that a means is provided for securely guiding the fork-shaped actuating means against canting, said means for securely guiding being disposed in proximity to said guide path of said actuating means.

10. A mechanism according to claim 1, characterized in that the roller means is provided with a contact surface of an elastic material.

11. A mechanism according to claim 1, characterized in that the roller means consists of an elastic material.

12. A mechanism according to claim 1, characterized in that means are provided for elastically supporting said adjusting means in an end position and that the roller means consists of a far-reaching non-elastic material.

13. A mechanism according to claim 12, characterized in that the roller means consists of metal.

14. A mechanism according to claim 1, characterized in that a means is provided for securely guiding the fork-shaped actuating means against canting, said means for securely guiding being disposed in proximity to said guide path of said actuating means.

15. An adjusting arrangement comprising:
   an adjusting member,
   means for rotatably mounting said adjusting member so as to be displaceable between at least a first end position and a second end position,
   lever means connected to said adjusting member for selectively displacing the same,
   an actuating means for actuating said lever means including a fork member,
   means for displaceably mounting said actuating means,
   means provided on said lever means for entraining said lever means with said actuating means, and
   means for prestressing said means for entraining at one fork of said fork member when said adjusting member is in one of said end positions.

16. An arrangement according to claim 15, wherein said means for displaceably mounting said actuating member includes a guide member.

17. An arrangement according to claim 16, wherein said entraining means includes at least one roller means provided on said lever means.

18. An arrangement according to claim 17, wherein said prestress means includes a contact surface of elastic material provided on said at least one roller means.

19. An arrangement according to claim 17, wherein said adjusting member is a substantially disk-shaped throttle valve, said prestress means includes a peripheral seal of elastic material provided on said throttle valve.

20. An arrangement according to claim 19, wherein said roller means includes a contact surface of inelastic material.

* * * * *